INVENTOR.
PAUL A. HERSCH

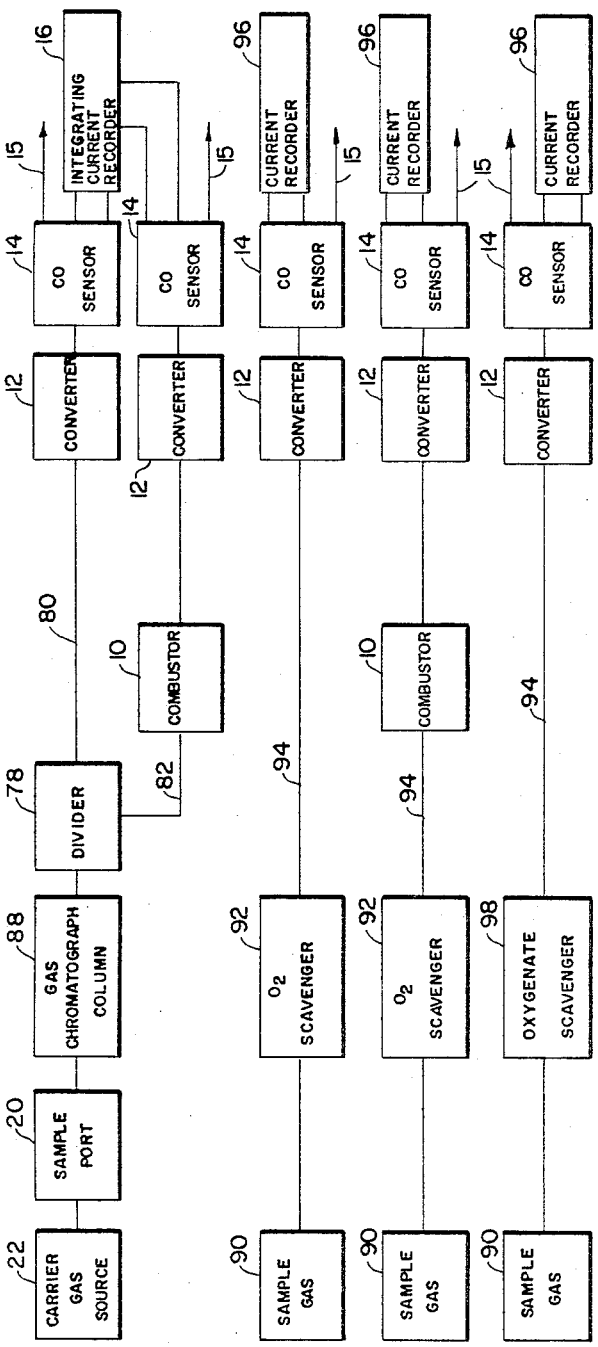

United States Patent Office 3,408,269
Patented Oct. 29, 1968

3,408,269
ANALYSIS OF ORGANIC MATERIALS
Paul A. Hersch, Fullerton, Calif., assignor to Beckman Instruments, Inc., a corporation of California
Filed Apr. 30, 1965, Ser. No. 452,256
18 Claims. (Cl. 204—1)

This invention relates to the analysis of organic samples and, more particularly, to quantitative organic microanalysis and to the continuous monitoring of organic samples.

The method of performing elemental microanalysis of organic samples includes, in general, three phases. The first phase includes the preparation, weighing and handling of the sample while the second phase includes the burning or oxidation of the sample. The third phase encompasses the separation and quantitative estimation of the combustion products of the sample. The first and second phases present no great difficulty today to accomplish. Until recent years, the third phase of elemental determinations was accomplished by either the absorption of the combustion products of the sample on solid absorbents and their subsequent determination by a gravimetric process or by means of a gasometric measurement. It is the third phase of the method for performing elemental microanalysis which has presented the greatest obstacle to automating and quickly performing microanalysis of organic samples.

Recently, methods have been developed for analyzing organic samples which do not involve the tedious gravimetric determination required by the classical method mentioned above. For example, recently reductive pyrolysis over hot carbon has been employed to convert organic oxygen to carbon monoxide. The carbon monoxide is then reacted with iodine pentoxide and the resulting elemental iodine is titrated manually. Even more recently still, carbon and hydrogen in organic compounds have been determined by oxidizing the sample on copper oxide for conversion to $CO_2$ and $H_2O$. These two species are then separated, analyzed separately by reaction over hot carbon, reacted with iodine pentoxide and finally the elemental iodine thus produced is determined by titration. Although the titrimetric method is relatively accurate, it is slow, requiring about 75 minutes per determination.

Even more recently, the electrochemical determination of carbon and hydrogen in organic compounds has been accomplished by quantitative reaction steps leading to an amount of water equivalent to carbon dioxide and then using as the sensor an electrolytic hygrometer for measuring the water from the organic hydrogen as well as the water corresponding to the carbon. Furthermore, instruments are available today for determining hydrogen and carbon, besides oxygen, in organic compounds utilizing as the means for proceeding with the third phase mentioned above gas chromatographs and conductivity cells. Although the above-mentioned methods and instruments are suitable for various purposes, none are known which have a desired balance between the characteristics of high accuracy, relatively quick response and extremely high sensitivity.

It is, therefore, the principal object of the present invention to provide a highly sensitive, accurate and rapid method and apparatus for determining carbon and hydrogen, as well as oxygen, in organic compounds.

Another object of the invention is to provide a method and apparatus for the batchwise or continuous determination of organic compounds in mixtures of compounds.

Another object of the invention is to provide a method for analyzing organic compounds which is extremely simple and requires little skill on the part of the operator to perform.

Another object of the invention is to provide a method and apparatus for analyzing organic samples wherein the output of the apparatus is determined solely by Faraday's law and is not affected by the geometry of the apparatus or by temperature. Thus, there is no need for calibration nor for the provision of standards with which to compare the samples.

A further object of the invention is to provide a method and apparatus for continuously monitoring organic compounds in gas streams.

According to the principal aspect of the present invention, use is made of the electrochemical apparatus for measuring carbon monoxide described in my copending patent application Ser. No. 375,423, filed June 11, 1964, now U.S. Patent No. 3,258,411, entitled "Improvement in Gas Analysis," assigned to the assignee of the present application. The carbon monoxide sensor is a coulometric system which produces an electrical signal related to the amount of carbon monoxide delivered thereto by Faraday's law. The present invention utilizes this carbon monoxide sensor by first combusting the hydrogen and carbon in an organic sample to form water and carbon dioxide, respectively, and then converting both water and carbon dioxide into carbon monoxide. Thereafter, the carbon monoxide is delivered to the carbon monoxide sensor which produces a current indicative of the rate at which carbon monoxide is delivered thereto. Accordingly, by integrating the current signal generated by the carbon monoxide sensor the amount of the carbon monoxide delivered to the cell may be determined, which is a function of the amount of hydrogen and carbon in the sample. This method may be modified as will be seen below to determine oxygen in organic samples, to determine carbon, hydrogen and oxygen separately in single organic compounds, to determine organic oxygen compounds and other organic species in mixtures of organic compounds and, finally, to make continuous determinations of oxygen compounds and certain organic species in continuously flowing gas streams.

Since the carbon monoxide sensor is capable of determining extremely low levels of carbon monoxide, the use of this sensor in the system of the present invention provides a means for performing microanalyses of organic samples of smaller size than herebefore have been capable of being determined, and with substantial accuracy and speed.

Other objects, aspects and advantages will become apparent from the following description taken in connection with the accompanying drawings wherein:

FIG. 3 is a schematic view of a modified form of the invention for determining carbon and hydrogen separately in a single organic compound;

FIG. 4 is a schematic view of a further embodiment of the invention wherein carbon and hydrogen, as well as elemental oxygen, may be determined in a single organic compound;

FIG. 5 is a schematic view of a modified form of the system in FIG. 4;

FIG. 6 is a schematic view of a system for measuring oxygen compounds in mixtures of organic compounds;

FIG. 7 is a schematic view of a further embodiment of the invention for measuring carbon and hydrogen together in mixtures of organic compounds;

FIG. 8 is a schematic view of a system for measuring organic oxygen compounds and other organic species in mixtures of organic compounds;

FIG. 9 is a schematic view of a system for continuously and selectively monitoring an oxygen compound in a gas stream either in the presence or absence of other compounds;

FIG. 10 is a schematic view of a system for continuously monitoring an organic compound in a gas stream irrespective of whether or not it is bearing oxygen;

FIG. 11 is a schematic view of a system for continuously monitoring molecular oxygen in a gas stream in the presence or absence of oxygen-bearing and other organic compounds.

Figure 1:
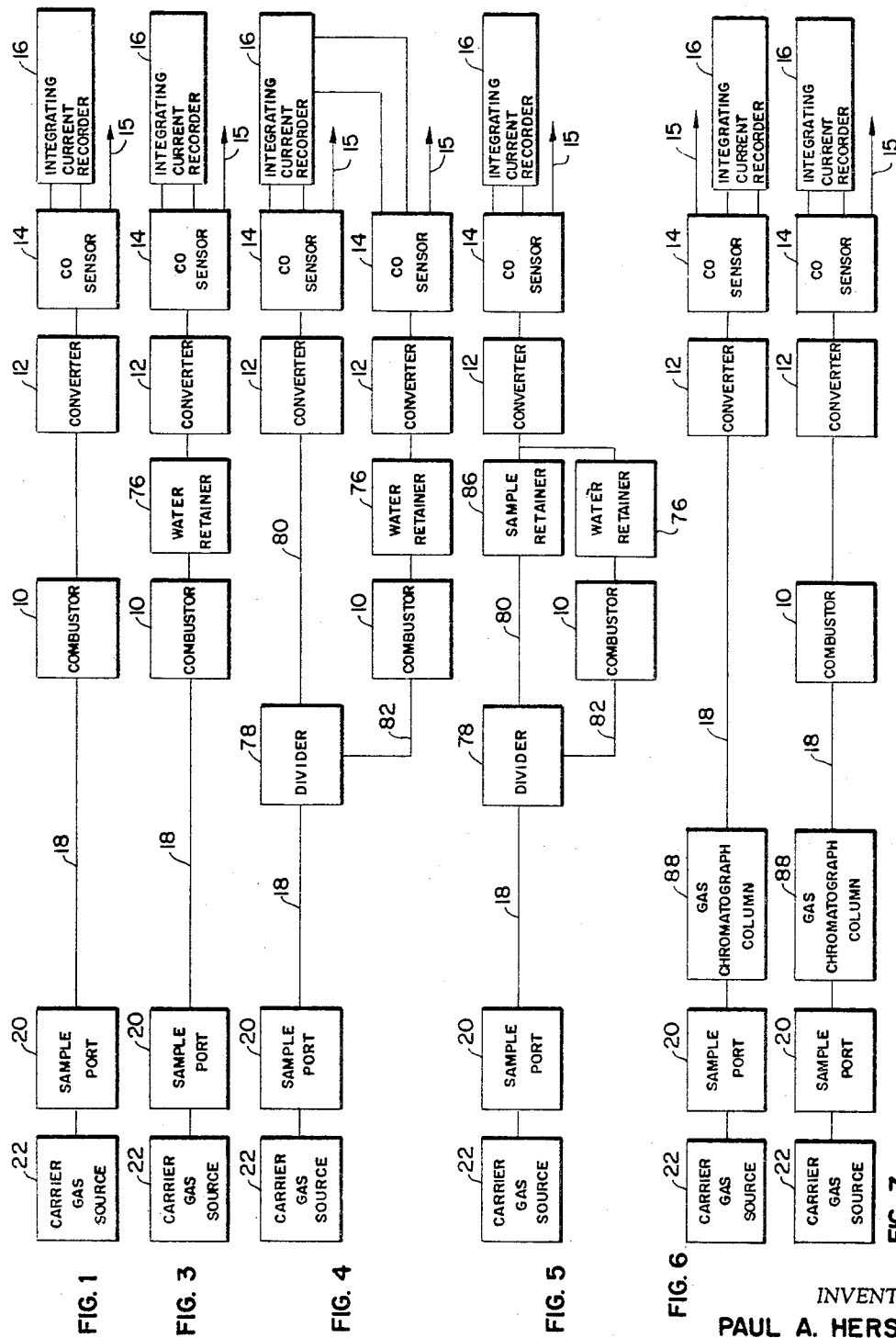
FIG. 1 is a schematic view of the various elements making up the system for measuring carbon and hydrogen together in a single organic compound.

Referring now to the drawings wherein like reference characters designate like or corresponding parts throughout the various systems illustrated, there is shown in FIG. 1 a schematic view of one embodiment of the invention which comprises four basic components, namely, a combustor 10 containing, for example, copper oxide, a converter 12 containing hot carbon for converting carbon dioxide and water into carbon monoxide, a carbon monoxide sensor 14 having a gas outlet 15 and means 16 for measuring the current generated by the sensor 14. The components 10, 12 and 14 are interconnected by a conduit 18 which includes a sample port 20. The end of the conduit 18 is connected to a carrier gas source 22.

Figure 2:
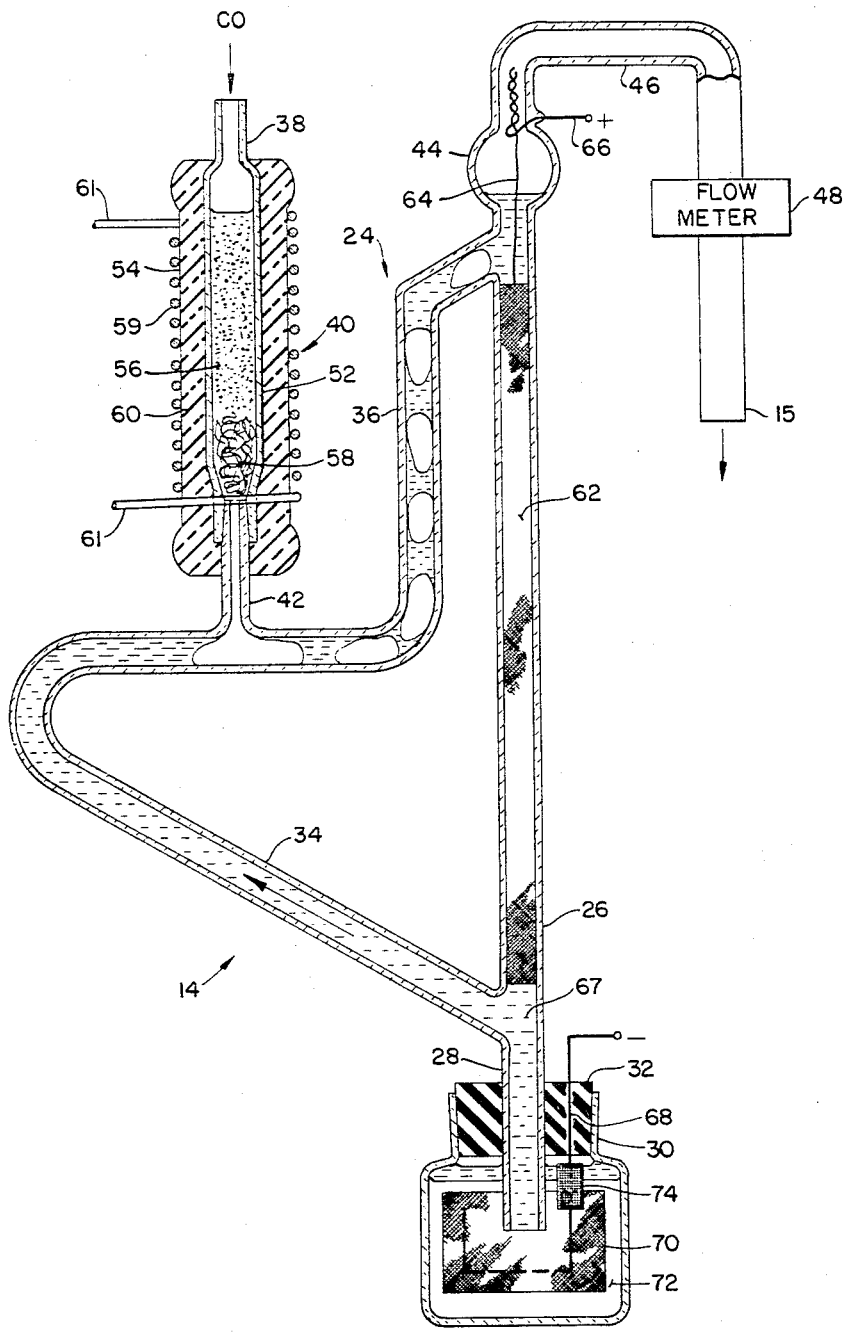
FIG. 2 is a partial sectional view of one form of a carbon monoxide sensor which may be utilized in any of the systems described herein.

The carbon monoxide sensor 14 illustrated in FIG. 2 of the drawings is the same as one of the embodiments of the sensor described in the aforementioned patent application. However, it should be understood that the carbon monoxide sensor may take the form of any of the embodiments described in said application. Although reference may be had to the aforementioned patent application for a detailed description of the carbon monoxide sensor 14, the sensor shall be described briefly herein to provide a full explanation of the invention. The sensor, as illustrated in FIG. 2, comprises a glass cell 24 having an elongated upright cathode section or compartment 26. The cathode section has its lower end connected through a downwardly extending stem 28 to a recessed anode section 30. A rubber stopper 32 secures the anode section 30 to the stem 28. The cathode compartment 26 at its upper and lower ends, respectively, connects through lateral openings to a conduit loop which includes an ascending tube 34 and an upright gas lift or bubble chain tube 36. A sampling duct 38 is connected to a conversion unit generally designated by numeral 40, the details of which will be described later. A duct 42 connects the bottom of the conversion unit to a lower portion of the gas lift tube 36. The apparatus immediately above the junction in the gas lift tube 36 and the upper end of the cathode compartment 26 is provided with a gas-liquid separation compartment 44. The other end of the separation compartment 44 is coupled to a conduit 46 which is connected to a flowmeter 48 and terminates with the sensor outlet 15.

The carbon monoxide conversion unit 40, for converting carbon monoxide into iodine vapor, consists of a central tube 52 surrounded by a cylindrical heater 54. The tube 52 contains granulated iodine pentoxide 56 which is supported in the tube by a small amount of glass wool 58 near the bottom of the tube. The heater 54 may consist of a helix 59 of nickel chromium wire wound around a tube 60 of a ceramic or other heat resistant material. The ends 61 of the helix 59 are adapted to be connected to a suitable source of power. The unit should be capable of holding a temperature of about 150° C. which is a suitable temperature for reacting carbon monoxide in a gas stream with iodine pentoxide to produce carbon dioxide and iodine vapor.

The cathode compartment 26 of the cell 24 houses a cathode 62 formed of an inert conductive material preferably rolled up to the configuration of a scroll. For example, the cathode may be a screen formed of noble metal, such as platinum, or may be an inactive carbonaceous fibrous material such as graphite cloth or graphite felt. A platinum wire 64 is attached at one end to the cathode 62 and its other end to a terminal platinum wire 66 fused through the glass near the exit of the cell. The cell is sufficiently filled with a suitable buffered neutral electrolyte 67 so that when the electrolyte circulates through the cell, which circulation is caused by the introduction of gas into the tube 36, the cathode will remain completely submerged in the electrolyte.

The anode compartment 30 carries a platinum wire 68 which extends through the stopper 32. A piece of graphite cloth 70 is placed inside the anode compartment and the wire 68 is woven through the cloth and therefore is electrically connected thereto. A sludge of active carbon 72 made by working finely divided carbon into the cell electrolyte 67 fills the major portion of the anode compartment 30, with the cloth 70 almost buried therein. It is essential that the carbon 72 be active, that is, it must participate in the chemical reaction occurring in the cell and not merely conduct electrically for the cell to operate as desired. A small piece of platinum screen 74 is attached to the wire 68 where the wire emerges from the carbon sludge to faciiltate the escape of hydrogen should a cathodic "charging" of the carbon become desirable after prolonged use. As illustrated, the part of the anode compartment 30 not occupied by carbon is partially filled with the cell electrolyte 67. The wires 66 and 68 connected to the cathode and anode, respectively, are thus available for connection to a current measuring device, namely component 16 as illustrated in FIG. 1.

Although it is most desirable to use active carbon as the anode, it should be understood that the anode may also take the form of silver or mercury, which are preferable if high levels of carbon monoxide exist in the sample gas stream.

In operation of the system illustrated in FIG. 1 of the drawing, and utilizing the carbon monoxide sensor illustrated in FIG. 2, upon delivery of an organic gaseous sample to the sample port 20, the following reaction occurs in the system:

In the combustor 10:

$$C + 2Cu_2O \rightarrow 4Cu + CO_2 \qquad (1)$$

$$2H + Cu_2O \rightarrow 2Cu + H_2O \qquad (2)$$

In the carbon converter 12:

$$CO_2 + C \rightarrow 2CO \qquad (3)$$

$$H_2O + C \rightarrow CO + H_2 \qquad (4)$$

Thus, it is seen that both the hydrogen and carbon in the sample are converted into carbon monoxide. The carbon monoxide is then carried by the carrier gas stream to the carbon monoxide sensor 14. Referring again to FIG. 2, the carrier gas stream passing through the conversion unit 40 provides the pumping action necessary to cycle the electrolyte solution between the bubble chain tube 36, where iodine vapor dissolves, to the cathode compartment 26 where iodine is reduced. The gas passes through the duct 42 in the form of a jet breaking up to give a chain of gas bubbles in tube 36, the bubbles being separated by short slugs of liquid. During the upward movement of the chain, the bubble-solution interface renews itself continually and turbulently, ensuring an efficient dissolution of the iodine. The gas stream and the liquid separate in compartment 44; the former exits through the conduit 46, flowmeter 48, and outlet 15 while the latter descends along the cathode 62, surrendering to it all dissolved iodine for reduction. Thereafter, the electrolyte returns to the bubble chain 36 by action of the carrier gas injected into the tube via duct 42.

The chemical reaction taking place in the conversion unit 40 of the carbon monoxide section 14 is:

$$5CO + I_2O_5 \rightarrow 5CO_2 + I_2 \qquad (5)$$

and the electrochemical reactions taking place in the galvanic cell 24 are:

At the cathode 62—

$$I_2 + 2e^- \rightarrow 2I^- \qquad (6)$$

At the active carbon anode 72—

$$..C + H_2O \rightarrow ..CO + 2H^+ + 2e^- \qquad (7)$$

where ..CO indicates not carbon monoxide, but a surface oxide of carbon of ill-defined formula. If the anode is either silver or mercury, the anodic reactions involve the oxidation of the metal to a metal halide.

As an example of the relationship of the electrical output with a sample inserted in the system in FIG. 1 of the drawing, the compound $C_nH_m$ will react as follows in the system:

In the combustor 10—

$$C_nH_m \rightarrow nCO_2 + \frac{m}{2} H_2O \qquad (8)$$

In the converter 12—

$$nCO_2 + \frac{m}{2}H_2O + nC \rightarrow \left(2n + \frac{m}{2}\right) CO + \frac{m}{2} H_2 \qquad (9)$$

In the $I_2O_5$ converter 40 of the CO sensor 14—

$$\left(2n+\frac{m}{2}\right)CO + \left(\frac{2n}{5}+\frac{m}{10}\right)I_2O_5 \rightarrow \left(2n\frac{m}{2}\right)CO_2 \left(\frac{2n}{5}+\frac{m}{10}\right)I_2 \qquad (10)$$

and the iodine thus produced is reduced in the galvanic cell 24 of the CO sensor as follows:

$$\left(\frac{2n}{5}+\frac{m}{10}\right)I_2 + \frac{4n+m}{5}e^- \rightarrow \frac{4n+m}{5}I^- \qquad (11)$$

which produces a response of $4n+m/5\ (96{,}500) = (7.72n + 1.93m)$
$\times 10^4$ coul./mole of $C_nH_m$ From this result the theoretical response factor of the system may be calculated for any compound. For example, a pentane ($n=5$, $m=12$) will show a response factor of $6.18 \times 10^5$ coul./mole or, in other terms, 8.57 coul./mg.

Generally, if a sample weighing $w$ grams, of a compound $C_nH_m$, or $C_nH_mO_p$, or $C_nH_mO_pN_q$, etc., having a molecular weight M, is injected or evaporated into the carrier gas stream, the galvanic current-time integral is $$Q = 1.93 \times 10^{10} \cdot \frac{4n+m}{M} \cdot w \text{ microcoulomb} \qquad (12)$$

Q depends only on the nature and weight of the compound, not on the dimensions and materials of the apparatus, nor on temperature, nor on other operational parameters. The determination of Q can provide valuable information, for example whether a wrong formula has been assessed to a particular compound. The integration may be carried out manually on a chart trace of the galvanic current output of the sensor 14, or mechanically by using a recorder fitted with a ball-and-disc integrator, or by electronic means. Such a system is referred to generally in the drawing as an integrating recorder 16.

If on the other hand the compound, instead of being introduced as finite quantity, is introduced continually into the carrier gas stream, or for any reason is already present in a gas stream, there results a continuous galvanic current $$i = 1.93 \times 10^{10} \cdot \frac{4n+m}{M} \cdot \frac{dw}{dt} \text{ microamp} \qquad (13)$$

where $dw/dt$ is the rate at which the compound enters the converter 12, in grams/second. For example, the introduction of anthracene ($n=14$, $m=10$, $M=178$) at the rate of one billionth of a gram per second will result in a current of 7.15 microampere.

Thus, there is provided by the present invention an extremely sensitive system for determining small quantities of organic materials, yet which is still very simple, inexpensive and requires little skill to operate.

It is to be understood that in order to analyze organic materials in the system of the present invention, the sample must be in the gaseous state. If the sample is a gas or volatile liquid, the sample port 20 provides a means for introducing the sample into the conduit 18. However, if the sample is a non-volatile liquid or a solid, the sample port must be sufficiently large to permit a refractory container holding the sample to be inserted in the conduit and means (not shown) must be provided to heat and vaporize the sample so that it may be carried by the carrier gas stream to the combustor 10. It is further to be understood that the carrier gas source 22 may be any one of a variety of inert gases, for example helium, argon or nitrogen. Associated with the carrier gas source there is conventionally provided a valve (not shown) for controlling the flow of gas through the system. The combustor 10 may also take any of a variety of forms, the most conventional being a chamber containing copper oxide as an oxygen donor and a heater associated therewith which is capable of heating the copper oxide to at least 600° C. and, preferably, somewhere in the range of 600 to 700° C. An example of another oxygen donor which could be utilized in the combustor 10 is cobaltous-cobaltic oxide.

The converter 12 comprises a chamber containing a body of carbon which is heated by any suitable heating means (not shown). Preferably, the carbon utilized in the converter is platinized so that reduced temperatures may be utilized to convert carbon dioxide and water to carbon monoxide. With platinized carbon, the temperature of the converter bed may be as low as 900° C.; with plain carbon higher temperatures are required.

It is to be understood that in the system illustrated in FIG. 1, since hydrogen and carbon are converted into carbon monoxide simultaneously, the system determines the sum $2n+m/2$ in Equations (8) to (11) above, not $n$ and $m$ singly. Consequently, merely by integrating the signal generated by the CO sensor 14 without prior separation of the combustion products $CO_2$ and $H_2O$, no indication is provided of the single amounts of hydrogen and carbon in a single organic compound delivered to the system. However, by slight modification of the system in FIG. 1, as illustrated in FIG. 3, the system may be adapted for determining hydrogen and carbon separately in a single organic compound in a carrier gas stream. To this end, there is provided in the system of FIG. 3 a device 76 for retaining water developed from the combustion of hydrogen in the combustor 10 so that only carbon dioxide, formed from the reaction of carbon in the sample with the oxygen donor, will pass to the converter 12. Thus, a first pulse of carbon monoxide will issue from the converter 12 and pass through the carbon monoxide sensor 14, generating a current signal which is a function of the amount of carbon only in the sample. Thereafter, the device 76 retaining the water between the combustor 10 and converter 12 is caused to release the water to the converter 12 whereby it will in turn be converted to carbon monoxide and produce a second pulse or slug of carbon monoxide. When the second pulse reaches the carbon monoxide sensor a second current signal is produced which is a function of the amount of hydrogen only in the sample.

The retaining device 76 may take any of several forms, for example, it may be a U-shaped tube connected into the conduit 18 which is surrounded by Dry Ice for freezing out the water passing through the conduit. Subsequently, the water may be re-evaporated and released from the retaining device 76 by withdrawing the Dry Ice. As an alternative, anhydrous barium chloride may be provided as a means for absorbing water passing therethrough and the wtaer may be released into the carrier gas stream by heating the barium chloride. The device 76 may further take the form of a simple delay column which retains water temporarily while first permitting carbon dioxide to pass through the conduit to the converter 12.

As mentioned in the aforementioned patent application, oxygen compounds may be converted into carbon monoxide by reacting them with heated carbon and delivering the carbon monoxide to the carbon monoxide sensor described therein. According to an additional embodiment of the present invention, as seen in FIG. 4, the system may be modified to permit the determination of oxygen in organic compounds, besides carbon and hydrogen. For this purpose, a divider or stream splitter 78 is provided in the conduit 18 for splitting the conduit into a first path 80 and a second path 82 downstream of the sample port 20. In the first path 80 there is connected a converter 12 and CO sensor 14 while in the second path 82 there is provided, in addition, a combustor 10 and water retaining device 76. The two CO sensors are then connected at a two point integrating current recorder 84. Consequently, when a single organic compound is inserted in the sample port 20, the carrier gas stream containing the compound will be split at the divider 78 with one portion flowing through the first path 80 where any oxygen compounds in the sample will be converted to carbon monoxide in the converter 12. The portion of sample carried by the second portion of the carrier gas stream flowing through the path 82 is combusted in the combustor 10 giving carbon dioxide and water; the water is then retained by the device 76 thus first permitting the carbon dioxide to pass to the converter 12 and, thereafter, the water is released from the retaining device 76, also to pass through the converter 12. Thus, by the system in FIG. 4, three different signals are delivered to the two-point recorder 84, the integration of the signals generated by the CO sensors being a measure of the amount of oxygen, carbon and hydrogen in the compound.

By modifying the system in FIG. 4 as shown in FIG. 5, it is possible to measure oxygen, carbon and hydrogen in a single organic compound without requiring two carbon monoxide sensors. In the system in FIG. 5, a sample retainer 86 is connected in the first path 80 of the conduit 18 between the divider 78 and converter 12. The sample retainer 86 may take the form of a freeze trap or delay column as described before which is capable of temporarily retaining the flow of the sample in the carrier gas stream passing through the first path 80 for a predetermined period of time. The downstream end of the second path 82 of the conduit containing the combustor 10 and water retainer 76 is connected into the first path 80 between the sample retainer 86 and converter 12. Consequently, when carbon dioxide and water produced in the combustor 10 pass through the water retainer 76, the water will be temporarily held back in retainer 76 while the $CO_2$ flows to the converter 12 where it is converted to carbon monoxide and conveyed to the sensor 14 which generates a current signal due to sample carbon but not affected by sample hydrogen. Subsequently, the water is released from the retainer 76 and passes to the converter 12 and then to the sensor 14 for generating a second current signal indicative of the hydrogen in the sample. Finally, the sample retainer 86 is caused to release its portion of sample directly to converter 12 so that only the sample oxygen is converted to carbon monoxide. A third signal is then generated by the sensor 14 which is a measure of the sample oxygen. An integration of the three signals thus produced provides a determination of the amount of carbon, hydrogen and oxygen, respectively, in the organic sample. Obviously the sequence of releasing the different portions of the sample for conversion into carbon monoxide may be altered, it merely being necessary that three discrete pulses of carbon monoxide be delivered to the carbon monoxide sensor 14, corresponding one to the carbon, one to the hydrogen and one to the oxygen of the sample.

In the systems of the invention, one microampere-minute of the time integrated current signal, an area that can readily be evaluated with no other amplification than is provided in, for example, a Beckman 10 millivolt recorder, corresponds to .0093 microgram of carbon, 0.0031 microgram of hydrogen, and 0.025 microgram of oxygen (when the systems in FIGS. 4 and 5 are utilized). Thus, the systems of the present invention are highly sensitive and may be utilized for making elemental analysis of organic samples of sizes many times smaller than those determinable by equipment available today. In fact, the systems of the present invention can analyze samples so small that no microbalance in existence could weigh them. With samples of a weight too small to be determined, the systems of the invention cannot measure the percentages of carbon, hydrogen and oxygen but can still give most valuable information, namely, the ratios in which these elements occur in the molecule. Where the weight of a pure compound is sufficient for applying conventional weighing techniques, the percentage composition of these three elements in the compound may be determined.

The carbon monoxide sensor 14 not only is useful for the elemental microanalysis of single organic compounds, but also may be utilized in analyzing organic species in mixtures of compounds. There is illustrated in FIG. 6 of the drawings a system for selectively detecting and determining oxygen-bearing organic compounds in a mixture of organic compounds. The system comprises a carrier gas source 22, sample port 20, gas chromatographic column 88, converter 12 and a CO sensor 14 all connected in series, with an integrating current recorder 16 connected to the sensor. The gas chromatographic separation column 88 separates chemical individuals in a mixture of the compounds. Every time a single compound containing oxygen enters converter 12, its oxygen will be converted to carbon monoxide which will cause the CO sensor to generate a current peak which is indicative of the amount of oxygen in the compound. Obviously, since in the sequence shown by FIG. 6 the non-oxygen bearing compounds in the mixture are not converted into carbon monoxide, no peaks are generated by the carbon monoxide sensor 14.

However, by modification of the system in FIG. 6, one may non-selectively detect and determine organic compounds in mixtures of compounds, irrespective of whether or not they contain oxygen. To this end, as seen in FIG. 7, there is inserted in the conduit 18 a combustor 10 between the gas chromatographic column 88 and converter 12. Consequently, each compound separately emerging from the gas chromatographic column 88, regardless of whether or not it contains oxygen, has its hydrogen and carbon combusted in the chamber 10, producing water and carbon dioxide, respectively. Thereafter, these two products are converted to carbon monoxide. This is carried to the CO sensor to generate a current which is a function of the formula and quantity of the particular compound issuing from the chromatographic column 88. The two systems in FIGS. 6 and 7 may be combined into a single system as shown in FIG. 8 by incorporating a stream divider 78 thus providing a system similar to that illustrated in FIG. 4. The system of FIG. 8 is, therefore, capable of measuring the oxygen compounds only in a mixture, or non-selectively, all compounds.

The carbon monoxide sensor 14 may further be utilized in instances when it is desired to continuously monitor a gas stream for oxygen compounds, organic species, generally, and molecular oxygen. Illustrated in FIG. 9 is a system for continuously and selectively monitoring a gas stream for its concentration in chemically bound oxygen, including the oxygen of carbon monoxide, carbon dioxide and water vapor. This system comprises a sample gas source 90, a scavenger of molecular oxygen 92, a converter 12 and a carbon monoxide sensor connected in series by a conduit 94. A simple current recorder 96 is connected to the carbon monoxide sensor 14 for measuring the current generated thereby. In order to purge the gas stream of any molecular oxygen so as to prevent interference with bound oxygen, the unit 92 may consist of a column of manganous oxide, or of activated copper on a solid carrier with a large surface area. Freed from molecular oxygen, the gas stream passes through the converter 12 where all bound oxygen converts to carbon monoxide. This will flow to the carbon monoxide sensor and generate a current as a function of the concentration of the total bound oxygen in the various compounds carried by the gas stream.

By inserting a combustor 10 in the conduit 94 between the scavenger 92 and the converter 12, as illustrated in FIG. 10, the system may be used for continuously monitoring a gas stream for its concentration in almost any organic compound, whether or not the compound is an oxygenate. As the converse of what is illustrated by FIG. 9, it is also possible to continuously measure molecular oxygen in gas streams containing mixtures of organic compounds by incorporating a scavenger of oxygenate compounds 98 instead of a scavenger of molecular oxygen 92, as seen in FIG. 11. In this way, compounds with bound oxygen are removed from the sample gas stream and only molecular oxygen is allowed to pass to the converter 12 and further, as carbon monoxide, to the CO sensor 14. The signal generated by the sensor 14 is then an indication of the concentration in the gas stream of molecular oxygen only.

Although several embodiments of the invention have been disclosed herein for purposes of illustration, it will be understood that various changes can be made in the form, materials, details, arrangements and proportions of the various parts without departing from the spirit and scope of the invention as defined by the appended claims.

What is claimed is:

1. In an apparatus for performing microanalysis of organic samples, the combination of:
   a conduit adapted to receive a stream of inert carrier gas at one end thereof;
   a sample port in said conduit adjacent to said one end;
   first means in said conduit downstream of said sample port for converting carbon into $CO_2$ and hydrogen into $H_2O$;
   second means in said conduit downstream of said first means for converting both $CO_2$ and $H_2O$ into CO;
   CO sensor means connected to said conduit downstream of said second means for generating a current indicative of the rate of delivery of CO to said sensor means and, therefore, a function of the amount of hydrogen and carbon in the sample;
   said CO sensor means comprising third means connected to said second means for converting CO into iodine vapor and a coulometric cell connected to said third means, said cell having positioned therein an anode and a cathode adapted to be joined by an electrolyte with said cathode being formed of an inert conductive material and said anode being selected from the group consisting of active carbon, silver and mercury; and
   means for connecting a current measuring means to said anode and said cathode of said CO sensor means for measuring the current generated thereby.

2. An apparatus as set forth in claim 1 including current measuring means connected to said anode and said cathode and means associated with said current measuring means for integrating the signal delivered to said current measuring means.

3. An apparatus for determining hydrogen and carbon separately in a single organic compound comprising:
   a conduit adapted to receive a stream of inert carrier gas at one end thereof;
   a sample port in said conduit adjacent to said one end;
   first means in said conduit downstream of said sample port for converting carbon into $CO_2$ and hydrogen into $H_2O$;
   second means in said conduit downstream of said first means for temporarily retaining the $H_2O$ issuing from said first means;
   third means in said conduit for converting both $CO_2$ and $H_2O$ into CO;
   CO sensor means connected to said conduit downstream of said second and third means for generating a current indicative of the rate of delivery of CO to said sensor means and, therefore, a function of the amount of hydrogen and carbon, respectively, in the compound;
   said CO sensor means comprising fourth means connected to said second means for converting CO into iodine vapor and a coulometric cell connected to said fourth means, said cell having positioned therein an anode and a cathode adapted to be joined by an electrolyte with said cathode being formed of an inert conductive material and said anode being selected from the group consisting of active carbon, silver and mercury; and
   means for connecting a current measuring means to said anode and said cathode of said CO sensor means for measuring the current generated thereby.

4. An apparatus for determining hydrogen, carbon and oxygen separately in a single organic compound comprising:
   a conduit adapted to receive a stream of inert carrier gas in one end thereof;
   a sample port in said conduit adjacent to said one end;
   means in said conduit downstream of said sample port dividing said conduit into first and second paths;
   first means in said first path for converting oxygen into CO;
   second means in said second path for converting carbon into $CO_2$ and hydrogen into $H_2O$;
   third means in said second path downstream from said second means for temporarily retaining $H_2O$;
   fourth means in said second path downstream of said third means for converting $CO_2$ and $H_2O$ into CO;
   first CO sensor means in said first path downstream of said first means;
   second CO sensor means in said second path downstream of said fourth means;
   each of said first and second CO sensor means comprising means for converting CO into iodine vapor and a coulometric cell connected thereto, said cell having positioned therein an anode and a cathode adapted to be joined by an electrolyte with said cathode being formed of an inert conductive material and said anode being selected from the group consisting of active carbon, silver and mercury; and
   means for connecting a current measuring means to said anode and said cathode of each of said CO sensor means for measuring the current generated thereby, the current being indicative of the rate of delivery of CO to said sensor means and, therefore, of the amount of hydrogen, carbon and oxygen, respectively, in the compound.

5. An apparatus for determining hydrogen, carbon and oxygen in a single organic compound comprising:
   a conduit adapted to receive a stream of inert carrier gas in one end thereof;
   a sample port in said conduit adjacent to said one end;
   means in said conduit downstream of said sample port dividing said conduit into first and second paths;
   first means in said first path for temporarily retaining said compound;
   second means in said second path for converting carbon into $CO_2$ and hydrogen into $H_2O$;

third means in said second path downstream of said second means for temporarily retaining $H_2O$;

said second path downstream of said third means recommunicating with said first path downstream of said first means;

fourth means in said first path downstream of the point of recommunication of said second path with said first path for converting $CO_2$ and $H_2O$ into CO;

CO sensor means connected to said first path downstream of said fourth means for generating a current indicative of the rate of delivery of CO to said sensor means and, therefore, a function of the amount of hydrogen, carbon and oxygen, respectively, in the compound;

said CO sensor means comprising means connected to said fourth means for converting CO into iodine vapor and a coulometric cell connected thereto, said cell having positioned therein an anode and a cathode adapted to be joined by an electrolyte with said cathode being formed of an inert conductive material and said anode being selected from the group consisting of active carbon, silver and mercury; and means for connecting a current measuring means to said anode and said cathode of said CO sensor means for measuring the current generated thereby.

6. An apparatus for determining oxygen-bearing organic compounds in mixtures of organic compounds comprising:

a conduit adapted to receive a stream of inert carrier gas in one end thereof;

a sample port in said conduit adjacent to said one end;

a chromatographic separation column in said conduit downstream of said sample port for separating individual compounds in said mixture of organic compounds;

first means in said conduit downstream of said chromatographic separation column for converting the oxygen in each oxygen-bearing compound into CO;

CO sensor means connected to said conduit downstream of said first means for generating a current indicative of the rate of delivery of CO to said sensor means and, therefore, a function of the amount of oxygen in each separate oxygen-bearing compound in said mixture;

said CO sensor means comprising means connected to said converting means for converting CO into iodine vapor and a coulometric cell connected thereto, said cell having positioned therein an anode and a cathode adapted to be joined by an electrolyte with said cathode being formed of an inert conductive material and said anode being selected from the group consisting of active carbon, silver and mercury; and means for connecting a current measuring means to said anode and said cathode of said CO sensor means for measuring the current generated thereby.

7. An apparatus for non-selectively determining organic compounds, irrespective of whether or not they contain oxygen, in a mixture of organic compounds comprising:

a conduit adapted to receive a stream of inert carrier gas in one end thereof;

a sample port in said conduit adjacent to said one end;

a chromatographic separation column in said conduit downstream of said sample port for separating individual compounds in said mixture of compounds;

first means in said conduit downstream of said chromatographic separation column for converting carbon into $CO_2$ and hydrogen into $H_2O$;

second means in said conduit downstream of said first means for converting $CO_2$ and $H_2O$ into CO;

CO sensor means connected to said conduit downstream of said second means for generating a current indicative of the rate of delivery of CO to said sensor means and, therefore, a function of the amount of hydrogen and carbon in each separate compound, oxygenated or not, in the mixture;

the CO sensor means comprising third means connected to said second means for converting CO into iodine vapor and a coulometric cell connected to said third means, said cell having positioned therein an anode and a cathode adapted to be joined by an electrolyte with said cathode being formed of an inert conductive material and said anode being selected from the group consisting of active carbon, silver and mercury; and means for connecting a current measuring means to said anode and said cathode of said CO sensor means for measuring the current generated thereby.

8. An apparatus for determining organic compounds, irrespective of whether or not they contain oxygen and, separately and solely, oxygen-bearing compounds in a mixture of organic compounds comprising:

a conduit adapted to receive a stream of inert carrier gas in one end thereof;

a sample port in said conduit adjacent to said one end;

a chromatographic separation column in said conduit downstream of said sample port for separating individual compounds in said mixture;

means in said conduit downstream of said separation column dividing said conduit into first and second paths;

first means in said first path for converting oxygen in each oxygen-bearing compound into CO;

second means in said second path for converting carbon into $CO_2$ and hydrogen into $H_2O$;

third means in said second path downstream of said second means for converting $CO_2$ and $H_2O$ into CO;

first CO sensor means connected in said first path downstream of said first means for generating a current indicative of the rate of delivery of CO to said first sensor means and, therefore, of the amount of oxygen in each separate oxygen-bearing compound in the mixture;

second CO sensor means connected in said second path downstream of said third means for generating a current indicative of the rate of delivery of CO to said second sensor means and, therefore, a function of the amount of hydrogen and carbon together in each separate compound, oxygenated or not, in the mixture;

each of said first and second CO sensor means comprising means for converting CO into iodine vapor and a coulometric cell connected thereto, said cell having positioned therein an anode and a cathode adapted to be joined by an electrolyte with said cathode being formed of an inert conductive material and said anode being selected from a group consisting of active carbon, silver and mercury; and means for connecting current measuring means to said anode and said cathode of said first and second sensor means for measuring the current generated thereby.

9. An apparatus for continuously and selectively monitoring oxygen compounds, including CO, $CO_2$ and $H_2O$, in a gas stream containing mixtures of compounds including organic species comprising:

a conduit adapted to receive said sample gas stream;

first means in said conduit for removing molecular oxygen from the sample gas stream;

second means in said conduit downstream of said first means for converting the oxygen in the oxygen compounds into CO;

CO sensor means connected in said conduit downstream of said second means for generating a current indicative of the rate of delivery of CO to said sensor means and, therefore, a function of the concentration of oxygen compounds in the stream;

said CO sensor means comprising third means connected to said second means for converting CO into iodine vapor and a coulometric cell connected to said third means, said cell having positioned therein an anode and a cathode adapted to be joined by an electrolyte with said cathode being formed of an inert conductive material and said anode being selected from the group consisting of active carbon, silver and mercury; and means for connecting a current measuring means to said anode and said cathode of said sensor means for measuring the current generated thereby.

10. An apparatus for continuously monitoring organic compounds in a gas stream containing mixtures of compounds including oxygen compounds comprising:

a conduit adapted to receive said gas stream;

first means in said conduit for removing molecular oxygen from the gas stream;

second means in said conduit downstream of said first means for converting carbon into $CO_2$ and hydrogen into $H_2O$;

third means in said conduit downstream of said second means for converting $CO_2$ and $H_2O$ into CO;

CO sensor means connected in said conduit downstream of said third means for generating a current indicative of the rate of delivery of CO to said sensor means and, therefore, a function of the concentration of hydrogen and carbon in the mixture of organic compounds in the gas stream;

said CO sensor means comprising fourth means connected to said third means for converting CO into iodine vapor and a coulometric cell connected to said fourth means, said cell having positioned therein an anode and a cathode adapted to be joined by an electrolyte with said cathode being formed of an inert conductive material and said anode being selected from the group consisting of active carbon, silver and mercury; and means for connecting a current measuring means to said anode and said cathode of said CO sensor means for measuring the current generated thereby.

11. An apparatus for continuously monitoring molecular oxygen in a gas stream containing mixtures of organic compounds comprising:

a conduit adapted to receive said gas stream;

first means in said conduit for removing oxygenates from the gas stream;

second means in said conduit downstream of said first means for converting molecular oxygen into CO;

CO sensor means connected in said conduit downstream of said second means for generating a current indicative of the rate of delivery of CO to said sensor means and, therefore, a function of the concentration of molecular oxygen in the gas stream;

said CO sensor means comprising third means connected to said second means for converting CO into iodine vapors and a coulometric cell connected to said third means, said cell having positioned therein an anode and a cathode adapted to be joined by an electrolyte with said cathode being formed of an inert conductive material and said anode being selected from the group consisting of active carbon, silver and mercury; and means for connecting a current measuring means to said anode and cathode of said sensor means for measuring the current generated thereby.

12. In a method for performing microanalysis of an organic sample, the steps comprising:

introducing said sample into an inert carrier gas stream;

converting the carbon and hydrogen in said sample into $CO_2$ and $H_2O$, respectively;

subsequently converting the $CO_2$ and $H_2O$ into CO;

converting the CO into iodine vapor;

thereafter conveying the carrier gas stream containing iodine vapor to a coulometric cell comprising a cathode formed of an inert conductive material and an anode selected from the group consisting of active carbon, silver and mercury, with said electrodes being joined by an electrolyte, said cell generating a current which is proportional to the rate at which iodine vapor is delivered thereto; and integrating the current signal generated by said cell as an indication of the amount of iodine vapor delivered thereto and, therefore, a function of the amount of hydrogen and carbon in the sample.

13. In a method for determining hydrogen and carbon in a single organic compound, the steps of:

introducing said compound into an inert carrier gas stream;

converting the carbon and hydrogen in said compound into $CO_2$ and $H_2O$, respectively;

temporarily retaining the $H_2O$ while allowing the $CO_2$ to pass further downstream in said carrier gas stream;

converting the $CO_2$ into CO;

converting the CO into iodine vapor;

thereafter conveying the carrier gas stream containing iodine vapor derived from the $CO_2$ to a coulometric cell comprising a cathode formed of an inert conductive material and an anode selected from the group consisting of active carbon, silver and mercury with said electrodes being joined by an electrolyte, said cell generating a current which is proportional to the rate at which iodine vapor is delivered thereto;

subsequently reintroducing the temporarily retained $H_2O$ into the carrier gas stream and converting the $H_2O$ into CO;

converting the CO derived from the $H_2O$ into iodine vapor;

thereafter conveying the gas stream containing iodine vapor derived from the $H_2O$ to said coulometric cell; and integrating the current signals generated by said cell as an indication of the amount of iodine vapor delivered thereto and, therefore, a function of the amount of carbon and hydrogen, respectively, in the compound.

14. In a method for determining oxygen-bearing compounds in a mixture of organic compounds, the steps comprising:

introducing said mixture into an inert carrier gas stream;

separating the individual compounds in said mixture in a chromatographic separation column;

converting the oxygen in the oxygen-bearing compounds issuing from the gas chromatographic separation column into CO;

converting the CO into iodine vapor;

thereafter conveying the carrier gas stream containing iodine vapor to a coulometric cell comprising a cathode formed of an inert conductive material and an anode selected from the group consisting of active carbon, silver and mercury with said electrodes being joined by an electrolyte, said cell generating a current which is proportional to the rate at which iodine vapor is delivered thereto; and integrating the current signal generated by said cell as an indication of the amount of iodine vapor delivered thereto and, therefore, a function of the amount of oxygen in each separate oxygen-bearing compound in the mixture.

15. In a method for determining organic compounds irrespective of whether or not they contain oxygen, in a mixture of organic compounds, the steps comprising:

introducing said mixture into an inert carrier gas stream;

separating the individual compounds of said mixture in a chromatographic separation column;

converting the carbon and hydrogen of each of the compounds as they emerge separately from said column into $CO_2$ and $H_2O$, respectively;

converting the $CO_2$ and $H_2O$ into CO;

converting the CO into iodine vapor;

thereafter conveying the carrier gas stream containing iodine vapor to a coulometric cell comprising a cathode formed of an inert conductive material and an anode selected from the group consisting of active carbon, silver and mercury, with said electrodes being joined by an electrolyte, said cell generating a current which is proportional to the rate at which iodine vapor is delivered thereto; and integrating the current signal generated by said cell as an indication of the amount of iodine vapor delivered thereto and, therefore, a function of the amount of carbon and hydrogen in each of said compounds.

16. In a method for continuously and selectively monitoring an oxygen compound, including CO, $CO_2$ and $H_2O$, in a gas stream, the steps comprising:

removing molecular oxygen from said gas stream;
converting the combined oxygen in the compounds into CO;
converting the CO into iodine vapor;
thereafter conveying the gas stream containing iodine vapors to a coulometric cell comprising a cathode formed of an inert conductive material and an anode selected from the group consisting of active carbon, silver and mercury, with said electrodes being joined by an electrolyte; and
measuring the current generated by the cell as an indication of the level of iodine vapor delivered thereto and, therefore, a function of the concentration of the oxygen-bearing compound in the mixture.

17. In a method for continuously monitoring an organic compound in a gas stream, the steps comprising:

removing molecular oxygen from said gas stream;
converting the carbon and hydrogen in the gas stream into $CO_2$ and $H_2O$ respectively;
converting the CO and $H_2O$ into CO;
converting the CO into iodine vapor;
thereafter conveying the gas stream containing the iodine vapor to a coulometric cell comprising a cathode formed of an inert conductive material and an anode selected from the group consisting of active carbon, silver and mercury, with the cathode being joined by an electrolyte; and
measuring the current generated by the cell as an indication of the iodine vapor delivered thereto and, therefore, a function of the concentration of the organic compound in the mixture.

18. In a method for continuously determining molecular oxygen in the presence or absence of organic compounds, the steps comprising:

removing all oxygen compounds from the gas stream;
thereafter converting the molecular oxygen in the gas stream into CO;
subsequently converting the CO into iodine vapor;
thereafter conveying the gas stream containing iodine vapor to a coulometric cell comprising a cathode formed of an inert conductive material and an anode selected from the group consisting of active carbon, silver and mercury, with said electrode being joined by an electrolyte; and
measuring the current generated by the cell as an indication of the level of iodine vapor delivered thereto and, therefore, a function of the concentration of molecular oxygen in said mixture.

References Cited

UNITED STATES PATENTS

| | | | |
|---|---|---|---|
| 2,805,191 | 9/1957 | Hersch | 204—1.1 |
| 3,234,117 | 2/1966 | Rost et al. | 204—195 |

HOWARD S. WILLIAMS, *Primary Examiner.*

T. TUNG, *Assistant Examiner.*